Feb. 15, 1955 D. K. JOHNSON 2,701,943
LAWN MOWING, MACERATING AND COLLECTING DEVICE
Filed July 12, 1949 9 Sheets-Sheet 1
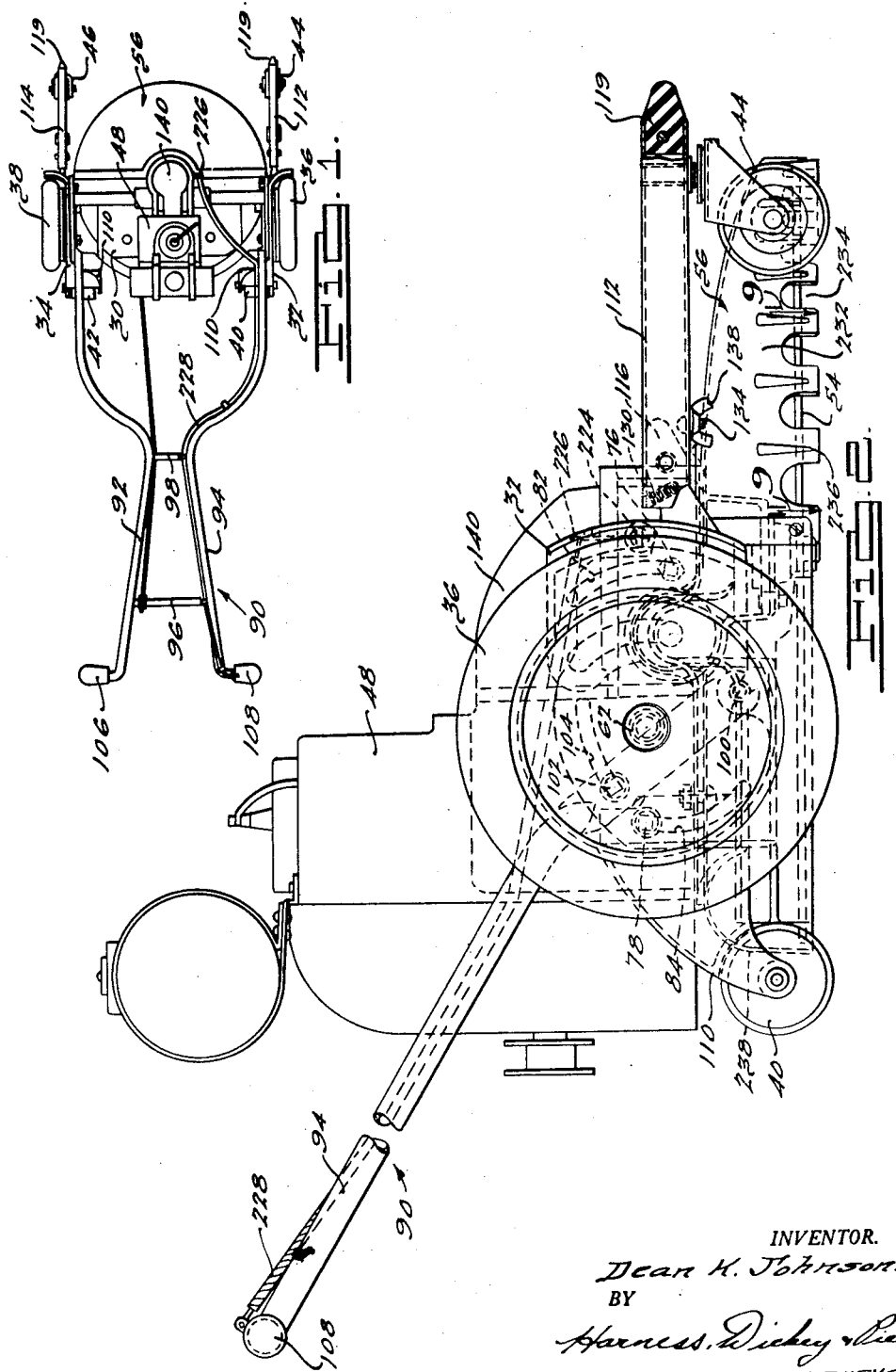
INVENTOR.
Dean K. Johnson.
BY
Harness, Dickey & Pierce
ATTORNEYS.

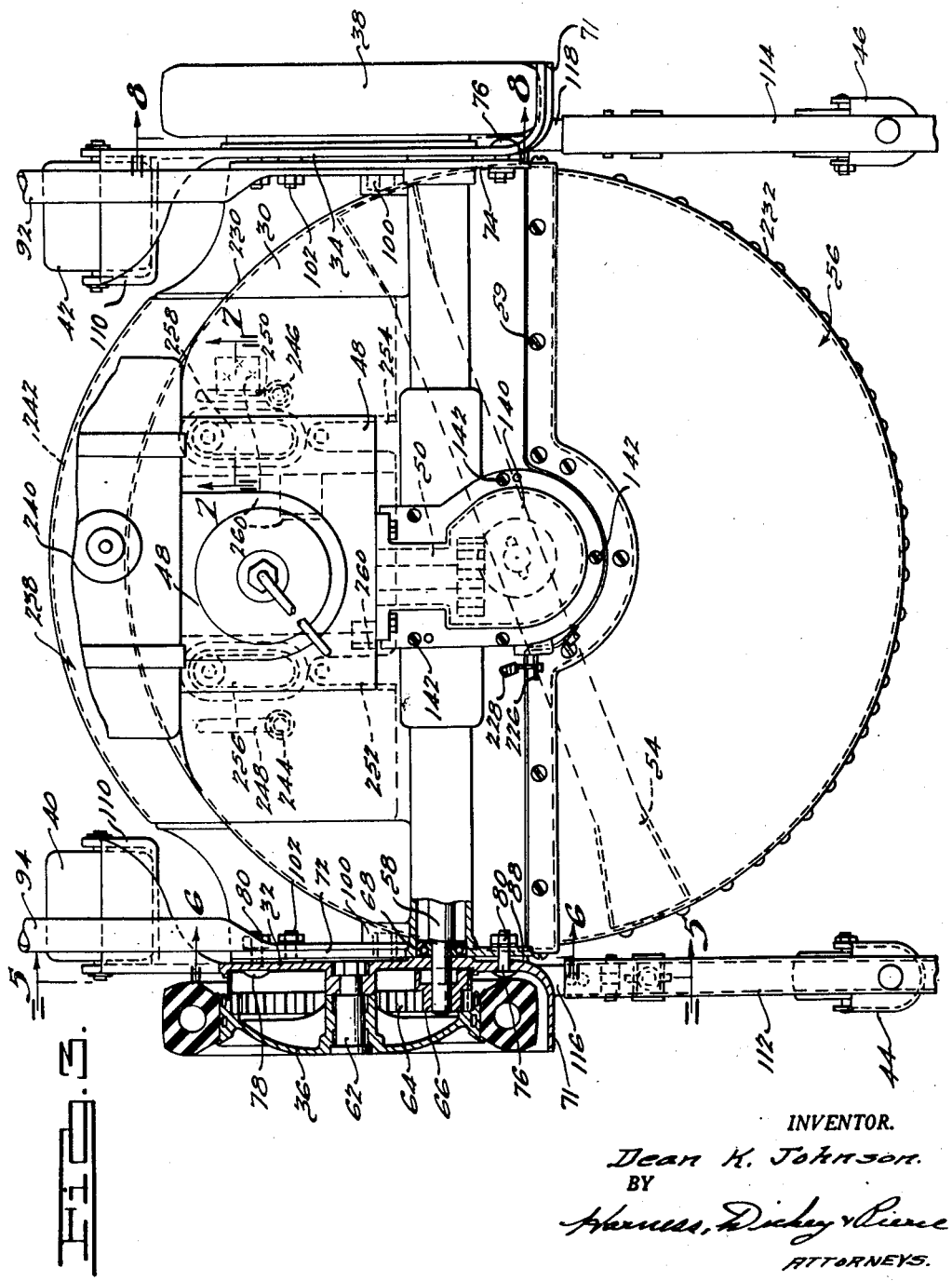

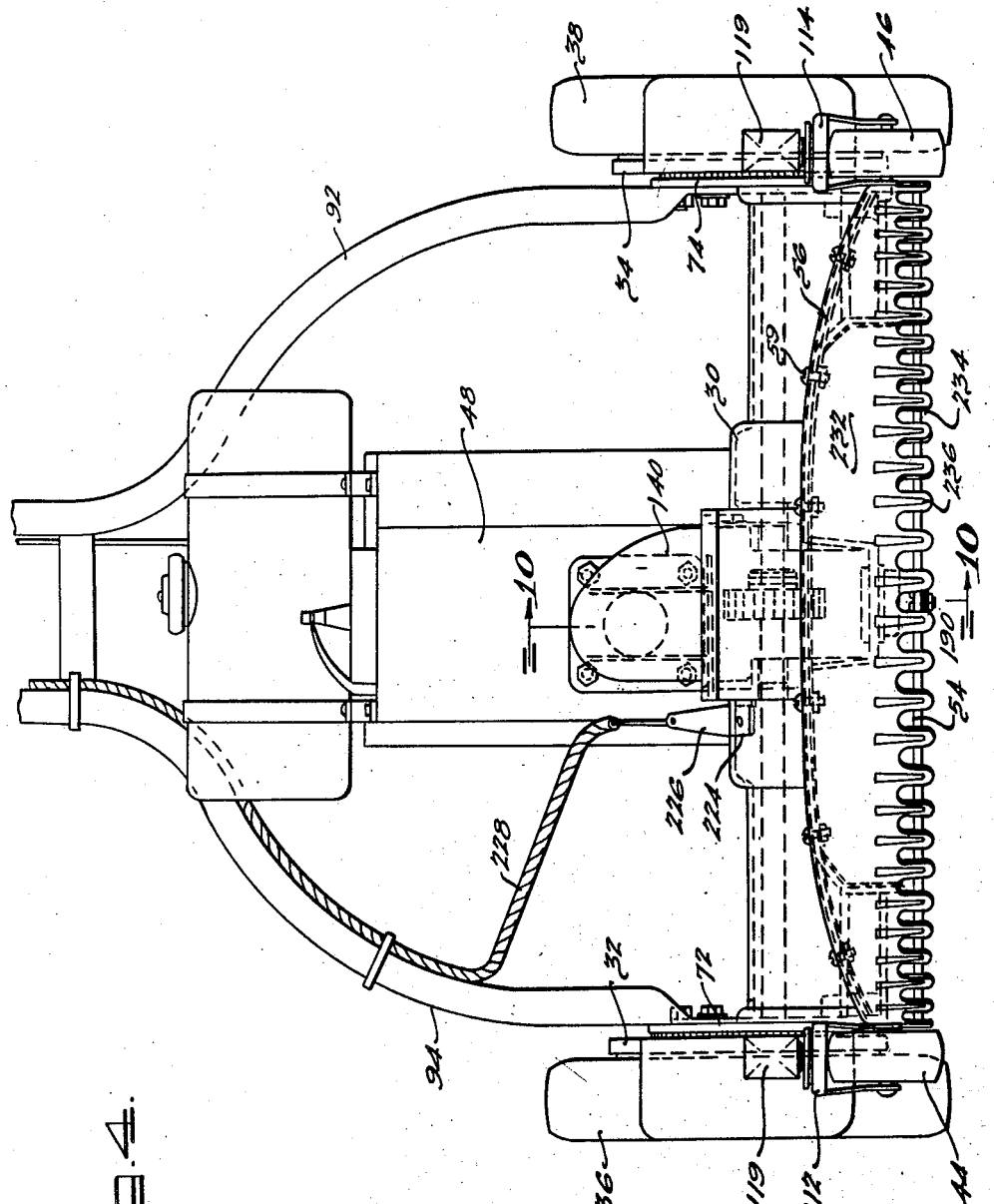

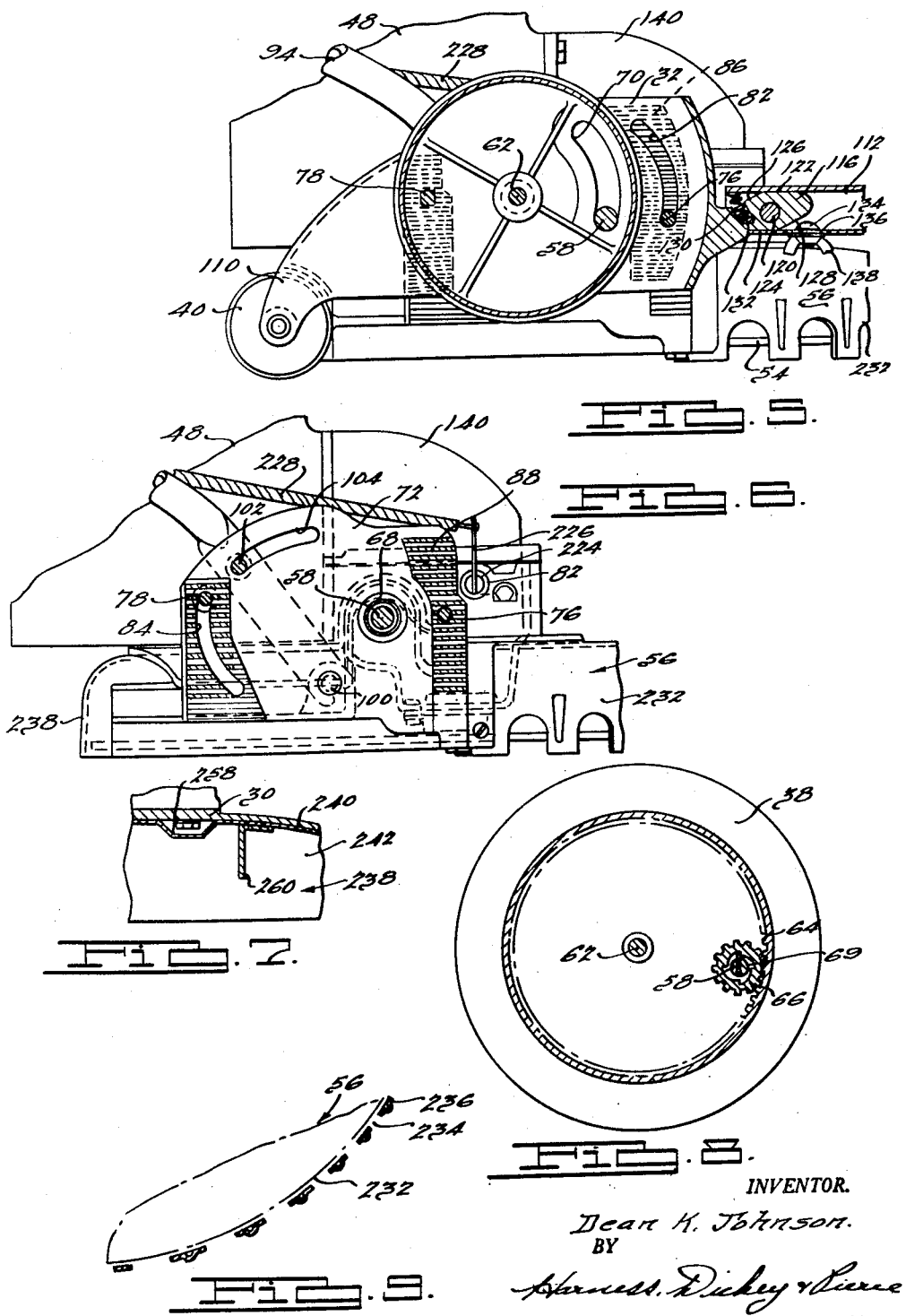

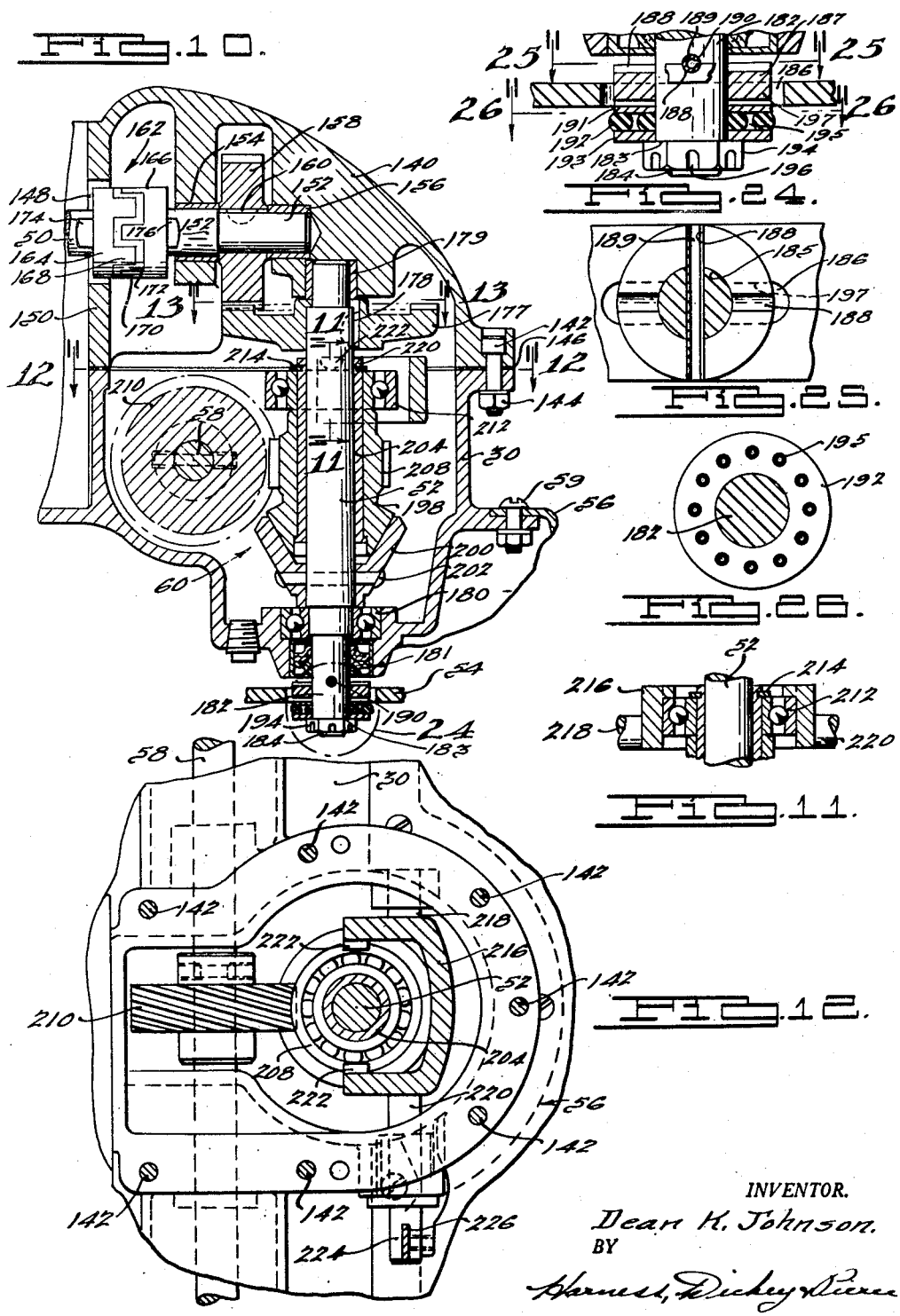

Feb. 15, 1955 D. K. JOHNSON 2,701,943
LAWN MOWING, MACERATING AND COLLECTING DEVICE
Filed July 12, 1949 9 Sheets-Sheet 6
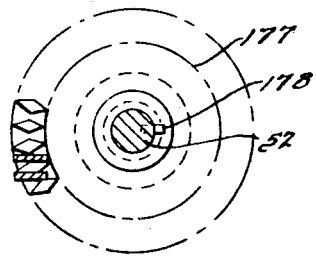
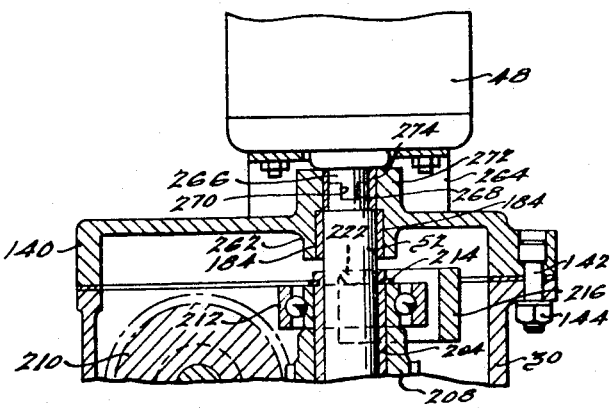
INVENTOR.
Dean K. Johnson.
BY
Harness, Dickey & Pierce
ATTORNEYS.

Feb. 15, 1955   D. K. JOHNSON   2,701,943
LAWN MOWING, MACERATING AND COLLECTING DEVICE
Filed July 12, 1949   9 Sheets-Sheet 7

INVENTOR.
Dean K. Johnson.
BY
Harness, Dickey & Pierce
ATTORNEYS.

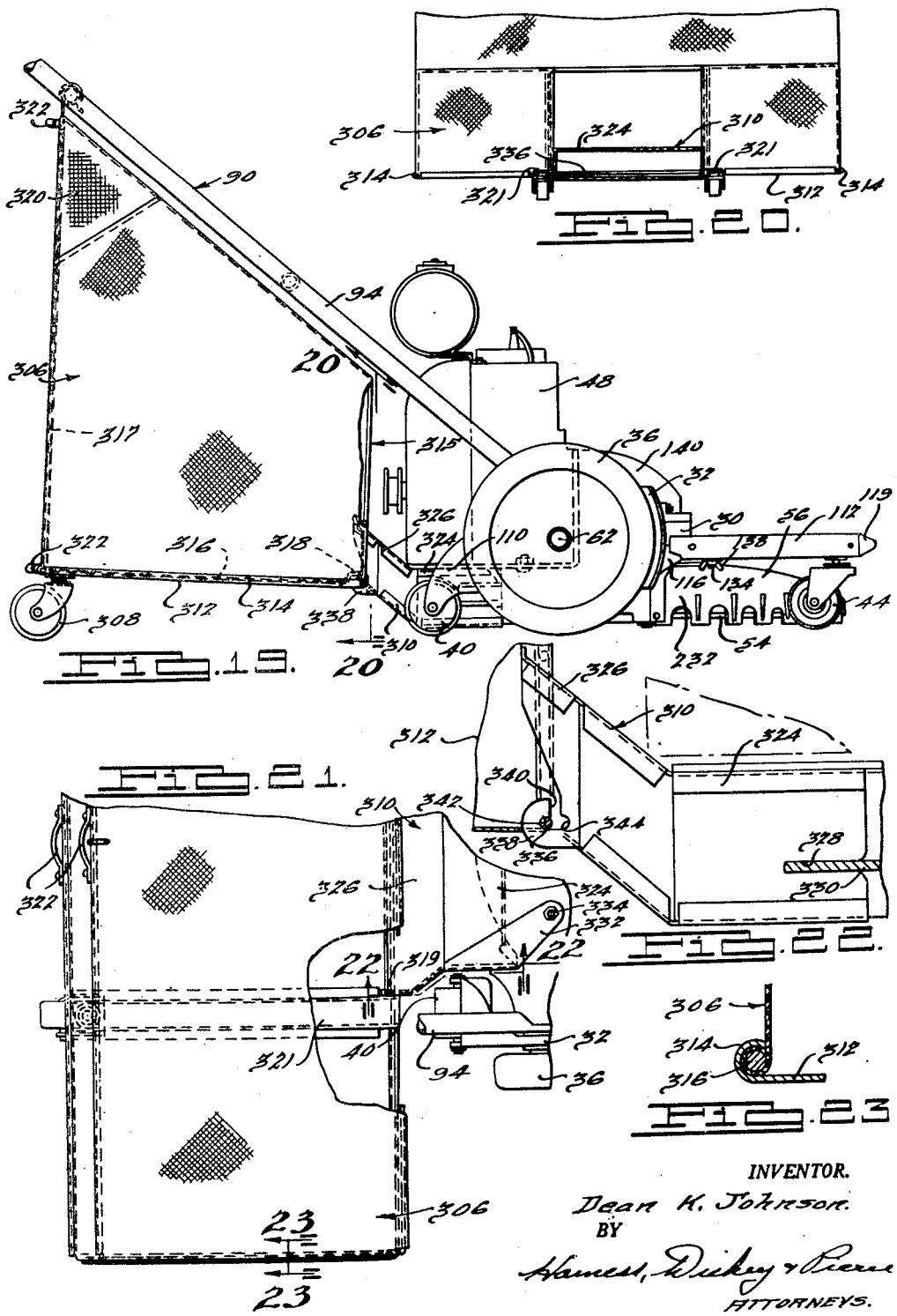

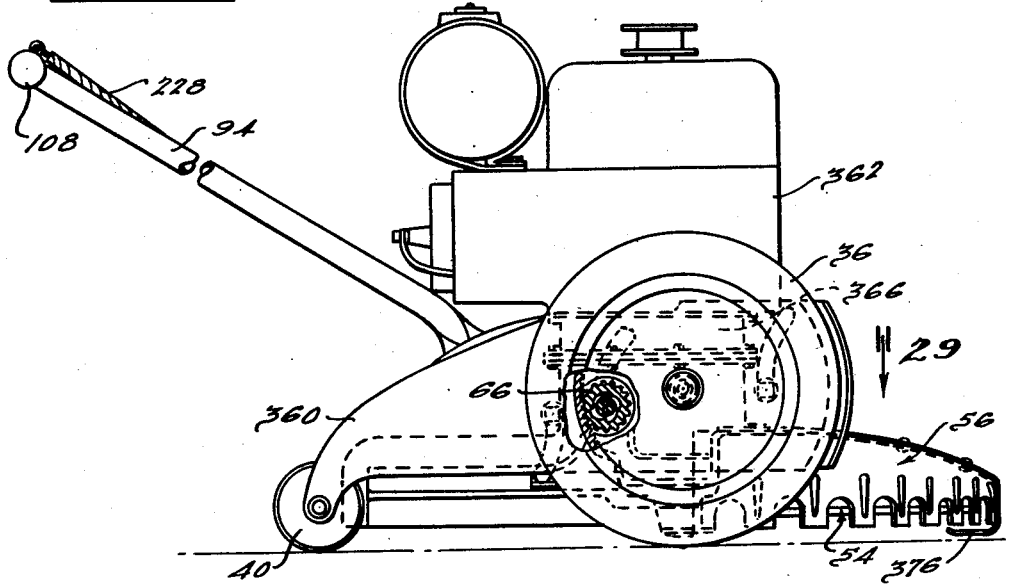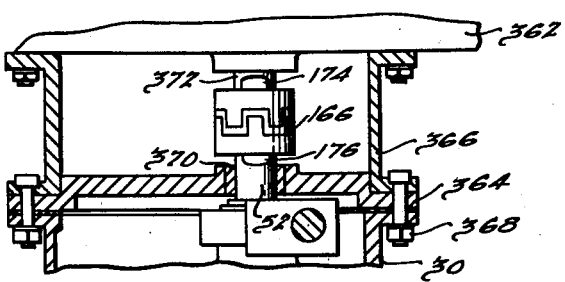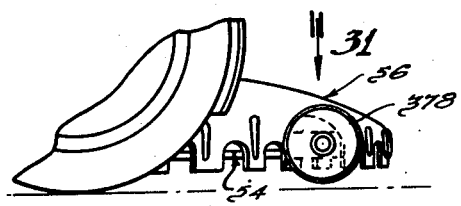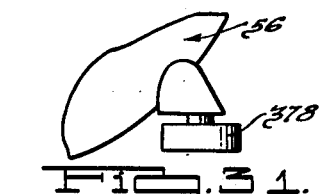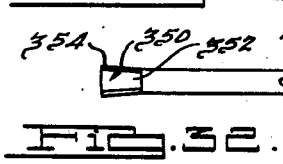

United States Patent Office 2,701,943
Patented Feb. 15, 1955

2,701,943

LAWN MOWING, MACERATING AND COLLECTING DEVICE

Dean K. Johnson, Detroit, Mich.

Application July 12, 1949, Serial No. 104,280

12 Claims. (Cl. 56—25.4)

This invention relates to lawn mowers and more particularly to power mowers of the type having a single, horizontally disposed, rotatably driven cutter blade.

An important object of the present invention is to provide a power mower of the above-mentioned character having novel means for driving both the grass-cutting blade and the ground-engaging wheels which support the mower.

Another object of the invention is to provide a lawn mower of the above-mentioned character that chops the cut grass into exceedingly small pieces so that the latter settles readily through the standing grass to form a mulch for the lawn.

Still another object of the invention is to provide a mower of the above-mentioned character in which the degree to which the grass particles are comminuted can be effectively controlled or regulated.

Yet another object of the invention is to provide a lawn mower of the above-mentioned character having novel means for adjusting the cutter blade vertically without tilting it from the horizontal.

A further object of the invention is to provide a lawn mower of the above-mentioned character having novel supporting means auxiliary to the main driving wheels for holding the cutter blade substantially parallel to the ground surface and which function in a unique manner to prevent the blade from striking against the ground when mowing rough or irregular terrain.

A still further object of the invention is to provide a lawn mower of the above-mentioned character wherein the drive to the ground-engaging wheels is disengaged automatically in the event the mower is stopped or in the event the mower runs against an obstruction which effectively prevents further progress.

A yet further object of the invention is to provide a lawn mower of the above-mentioned character that can be readily adapted to pick up leaves and the like from the lawn or for use as a snow plow.

Other objects and advantages of the invention will be apparent during the course of the following description.

In the drawings forming a part of this specification and wherein like numerals are employed to designate like parts throughout the same:

Fig. 1 is a top plan view of a lawn mower embodying the invention;

Fig. 2 is an enlarged side-elevational view thereof;

Fig. 3 is an enlarged plan view of the same, parts thereof being broken away and shown in sections for clearness of illustration;

Fig. 4 is a front-elevational view of the mower;

Fig. 5 is a vertical sectional view taken on the line 5—5 of Fig. 3;

Fig. 6 is a vertical sectional view taken on the line 6—6 of Fig. 3;

Fig. 7 is a fragmentary, vertical sectional view taken on the line 7—7 of Fig. 3;

Fig. 8 is a vertical sectional view taken on the line 8—8 of Fig. 3;

Fig. 9 is a fragmentary, horizontal sectional view taken on the line 9—9 of Fig. 2;

Fig. 10 is an enlarged fragmentary, vertical sectional view taken on the line 10—10 of Fig. 4;

Fig. 11 is a fragmentary, vertical sectional view taken on the line 11—11 of Fig. 10;

Fig. 12 is a fragmentary, horizontal sectional view taken on the line 12—12 of Fig. 10;

Fig. 13 is a fragmentary, horizontal sectional view taken on the line 13—13 of Fig. 10;

Fig. 14 is a fragmentary, vertical sectional view showing a modified means for mounting the prime mover on the mower and for connecting the same to the drive shaft of the cutter blade;

Fig. 15 is a view similar to Fig. 14 but showing still another modified construction which is contemplated and within the scope of the instant invention;

Fig. 16 is a view similar to Fig. 14 but showing still another modified driving connection;

Fig. 19 is a side elevational view showing the mower adapted for use in picking up leaves and the like from the lawn;

Fig. 20 is a reduced fragmentary, vertical sectional view taken on the line 20—20 of Fig. 19;

Fig. 21 is a fragmentary plan view particularly illustrating the manner in which the leaf container is attached to the mower;

Fig. 22 is an enlarged, fragmentary, vertical sectional view taken on the line 22—22 of Fig. 21;

Fig. 23 is an enlarged, fragmentary, vertical sectional view taken on the line 23—23 of Fig. 21;

Fig. 24 is an enlarged view of the structure illustrated in Fig. 10, as viewed in the circle 24 thereof;

Fig. 25 is a sectional view of the structure illustrated in Fig. 24; taken on the line 25 thereof;

Fig. 26 is a sectional view of the structure illustrated in Fig. 24, taken on the line 26 thereof;

Fig. 27 is a view of structure, similar to that illustrated in Fig. 2, showing a further form of a lawn mower;

Fig. 28 is an enlarged sectional view of the engine support and connection, similar to that illustrated in Fig. 14;

Fig. 29 is a broken plan view of the structure illustrated in Fig. 27, as viewed from point 29 thereof;

Fig. 30 is a broken plan view of structure, similar to that illustrated in Fig. 29, showing a modified form thereof;

Fig. 31 is a view in elevation of the structure illustrated in Fig. 30;

Fig. 32 is a plan view of the cutting bar of blade employed with the lawn mower of the present invention; and Fig. 33 is an enlarged end view of the blade illustrated in Fig. 32.

Figure 17:
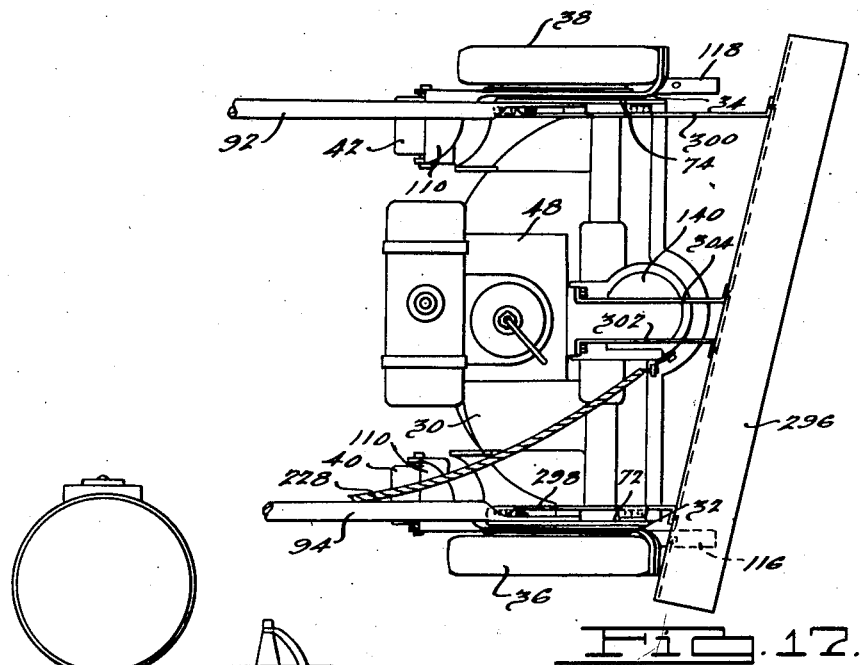
Fig. 17 is a top plan view showing the mower adapted for use as a snow plow.

Considered in certain of its broader aspects, the instant mower construction comprises a casting 30 which forms the main frame of the machine. Side rails 32 and 34 fastened to the casting 30 at opposite sides thereof carry ground-engaging wheels 36 and 38 and stub rollers 40 and 42. The wheels 36 and 38 support the mower for movement across the ground in the conventional manner, and rollers 40 and 42 cooperate with the wheels to hold the casting more or less parallel to the surface traversed. Casters 44 and 46 are connected to side rails 32 and 34 respectively ahead of wheels 36 and 38. and they also cooperate with the wheels to position the mower properly on the ground.

Surmounting the casting 30 is a prime mover 48 having a horizontal drive shaft 50 connected by suitable gearing to a vertical shaft 52 which carries and rotatably drives a cutter bar 54. The latter is arranged horizontally below the casting and functions in the conventional manner to cut the grass.

A generally semicircular hood 56 fastened to the casting 30 by screws 59 co-operates with the casting to provide a housing which entirely covers the cutter bar 54 and serves the dual purpose of protecting the blade and of shielding persons and objects from the blade. The hood 56 is left on the casting 30 at all time during normal operation of the machine; however, under certain circumstances, as when the mower is used to cut tall, heavy weeds, it may be desirable to remove the hood and to use the mower with the blade exposed forwardly of the casting 30.

The wheels 36 and 38 also are driven by the prime mover 48. To this end a horizontal shaft 58 is journaled for rotation in the casting 30 immediately behind the vertical shaft 52, and the two shafts are connected by a clutch and suitable gearing designated generally by the numeral 60. Conventional driving connections are provided between the shaft 58 and wheels 36 and 38. The clutch and gearing are enclosed in a suitable gear box which preferably is kept at least partially filled with oil so that the clutch elements and the gears operate in an oil bath.

It is a feature of this invention that the gears react against a manual control to disengage the clutch so that the drive to the wheels is interrupted whenever the wheels are braked or when the wheels engage an insurmountable obstruction. Under these conditions the wheels are relieved of driving torque and the full power of the prime mover 48 is delivered to the cutter blade 54. Also, the speed at which the mower travels can be controlled by actuation of the manual control to selectively engage the clutch elements. Thus, the cutter bar 54 can be operated at full speed at all times regardless of the forward movement of the mower. Also, the cutter bar can be operated at full speed when the clutch elements are fully disengaged to disconnect the driving wheels from the power source. This unique arrangement permits the mower to be readily maneuvered and is used to great advantage when mowing around trees, along borders or in relatively cramped quarters.

A detailed description of the mower is now given.

The wheels 36 and 38 are journaled for rotation on stub axles 62 which are carried by side rails 32 and 34 respectively, and the wheels carry the usual internal ring gears 64 which mesh with driving pinion 66 on the terminals of shaft 58. Preferably, pinions 66 are connected to the shaft 58 by conventional overrunning clutch mechanisms 69, as shown in Fig. 8, which establish a direct drive between the shaft and the pinion to drive the mower forwardly and which permit the pinions to ratchet freely on the shaft when the mower is pushed forwardly. In this connection it will be observed that the shaft 58 is journaled for rotation in bearings 68 provided at opposite sides of the main frame casting 30 and that the terminal portions thereof project through vertically elongated, arcuate slots 70 in side rails 32 and 34 (Fig. 5). Thus wheels 36 and 38 rotate on axle 62, and shaft 58 acts through pinions 66 and ring gears 64 to rotatably drive the wheels. Outturned flanges 71 at the forward ends of side rails 32 and 34 provide fenders for wheels 36 and 38.

In use, it is necessary from time to time to adjust the height of the cutter bar 54 above the ground, and this is accomplished according to the present invention by raising or lowering the main frame casting 30 relative to the side rails 32 and 34. In a mower of this type, it is essential to maintain the main frame 30 and the cutter bar 54 horizontal at all times. The problem of adjusting the frame or casting 30 vertically without tilting it from the horizontal and without obstructing or in any way interfering with the driving engagement between pinions 68 and ring gears 64 and at the same time holding the parts solidly in the selected adjusted position has been a very real one and difficult of solution. From a practical standpoint it must be possible to make the adjustment easily and quickly. Thus the connecting elements must be relatively few and readily accessible. Also, means must be provided for fastening the relatively movable parts solidly together in each of the adjusted positions.

According to the present invention, the above results are achieved in a highly efficient manner by fastening the side rails 32 and 34 to upstanding flanges 72 and 74 which are formed integrally on the main frame casting at opposite sides thereof. Each side rail is fastened to its respective flange by front and rear bolts 76 and 78 and nuts 80 (Fig. 3). The front bolts 76 extend through vertically disposed arcuate slots 82 provided in the side rails 32 and 34 (Fig. 5), and the rear bolts 78 extend through vertically disposed arcuate slots 84 provided in flanges 72 and 74 (Fig. 6).

In the drawings I have shown the casting 30 in fully lowered position; consequently, bolts 76 are shown at the bottom of their respective slots 82, and bolts 78 are shown at the top of their respective slots 84. By reason of the arcuate form of slots 70, 82, and 84, the casting 30 travels a curved path during vertical adjustment to maintain pinions 66 at all times in the same spatial relationship with ring gears 64. Thus, adjustment is achieved without disconnecting or in any manner affecting the relationship between pinions 66 and ring gears 64 and by the simple expedient of loosening the four fastening nuts 80.

In order to hold the side rails 32 and 34 exactly horizontal in all adjusted positions thereof, I provide horizontal serrations 86 on the inner faces of the rails which interfit and interlock with corresponding serrations 88 on the outer faces of flanges 72 and 74. Serrations 86 and 88 may have any desired or conventional shape. The serrations here shown are in the form of vertically spaced, essentially square ribs which snugly interfit to effectively lock the side rails to the casting. The particular shape of the ribs prevents the casting 30 from tilting inadvertently before nuts 80 are tightened; and, in operation, the weight of the casting and its adjuncts is sustained by the serrations rather than by bolts 76 and 78.

In addition to the above, it is a feature of this invention that each side rail carries a roller disposed rearwardly of the main driving wheel and a caster disposed forwardly thereof. By assembling and correlating the members in this manner, all are adjusted simultaneously with the side rails. Also, by mounting individual rollers on the side rails, they are disposed well to one side of the mower frame so that a container for collecting lawn clippings, leaves and the like can be mounted therebetween close to the cutter-blade housing.

Specifically, rollers 40 and 42 are journaled for rotation in brackets 110 which are formed integrally on the rearward ends of side rails 32 and 34. Casters 44 and 46, on the other hand, are carried by supporting arms 112 and 114 which in turn are fastened to forward extensions 116 and 118 on side rails 32 and 34. The arms 112 and 114 here shown are generally tubular in form and bumpers 119 of rubber or the like are press-fitted in the open outer ends thereof. The open rearward ends of arms 112 and 114 fit over the extensions 116 and 118 and are fastened thereto by pivots 120. Arms 112 and 114 normally seat flatly on upper and lower horizontal surfaces 122 and 124 of the extensions 116 and 118 but unless otherwise restricted are rockable about pivots 120 within limits defined by the upper and lower inclined surfaces 126 and 128 (Fig. 5). Springs 130 seated in sockets 132 provided in the upper inclined surfaces 126 bear upwardly against arms 112 and 114 to hold the same in normally horizontal position but yield to permit upward rocking movement of the arms in the event casters 44 and 46 encounter a bump or other obstruction. Screws 134 are movable in longitudinal slots provided in arms 112 and 114 under extensions 116 and 118, and the heads of the screws can be selectively positioned with respect to the lower inclined surfaces 128 to limit upward rocking movement of the arms. Nuts 138 hold the screws 134 in selected adjusted positions.

In general, maximum pivotal movement of the arms 112 and 114 is desirable when mowing relatively rough or uneven ground. The casters 44 and 46 travel over the ground surface ahead of the mower and position the mower blade properly with respect to uneven ground surfaces. They steady the mower while preventing the power wheel to be raised from the ground and are adjusted to suit the particular terrain being mowed so as to provide a smooth cut. The rougher the terrain the more knee action is required, and for relatively flat terrains it is desirable to limit or even prevent rocking movement of arms 112 and 114.

A handle 90 is provided for manually guiding and maneuvering the mower. The handle here shown comprises a pair of similarly shaped, tubular members 92 and 94 fastened rigidly together by cross members 96 and 98. The lower or forward terminal portions of members 92 and 94 preferably are flattened, as perhaps best shown in Figs. 1 and 6, and are fastened to respective flanges 72 and 74 by pivots 100. Movement of the handle 90 about pivots 100 is limited by pins 102 which extend laterally from the handle members 92 and 94 and travel in arcuate slots 104 provided in flanges 72 and 74. The upper or rearward ends of handle members 92 and 94 extend laterally outwardly in divergent relation and carry hand grips 106 and 108.

The specific mechanism here shown for transmitting motion from the prime mover 48 to the cutter bar 54 is partially supported in a gear box cover 140 which surmounts the gear box portion of the main frame casting 30. Screws 142 and nuts 144 fasten the gear box cover 140 to the frame, and the joint between the parts is sealed by a gasket 146.

As suggested, the prime mover 48 here shown is a gasoline engine of the type conventionally used on small power mowers and having a horizontal drive shaft 50. As perhaps best shown in Fig. 10, the shaft 50 extends forwardly from the prime mover 48 and projects horizontally into the gear box cover 40 through an opening 148 in the rear wall 150 of the cover. Within the cover 140 and in axial alignment with the drive shaft 50 is a shaft 152 which is rotatably supported by spaced bearings 154 and 156 and carries a pinion 158 which is fastened thereto by a key 160 or the like. The shafts 50 and 152 are connected for mutual rotation by a coupling 162.

Any suitable or conventional means for coupling the two shafts can be used, but I prefer to employ the particular coupling here shown, since it permits the drive shaft to be easily and quickly connected to or disconnected from the driven shaft 152 and thus facilitates removal of the prime mover 48 from the mower when repair or replacement of parts is necessary. Also, the particular coupling 162 here shown is uniquely constructed to absorb shocks which result when the mower is used to cut heavy weeds or the like or when the cutter bar 54 strikes a hard, unyielding obstruction of some kind.

More particularly, the coupling 162 here shown comprises a pair of axialy spaced disk-shaped members 164 and 166 having spaced interfitting lugs 168 and 170. It will be observed that the lugs 168 and 170 are spaced both axially and radially and that the space therebetween is filled with rubber 172. The rubber 172 is molded in any suitable manner to the members 164 and 166 so as to provide, in effect, a one-piece unit. Shafts 50 and 152 are formed with a flat surface 174 and 176 forming D-shaped ends which fit snugly in correspondingly shaped openings in respective members 164 and 166 so that a direct rotary drive is established between the shafts through the coupling 162. If desired, other types of couplings may be employed which are well known in the art to be suitable for connecting the ends of the shafts.

The pinion 158 meshes with a face gear 177 which is fixed to vertical shaft 152 by a key 178. At its upper end, shaft 52 is journaled in a bearing 179 in cover 140 and the lower end thereof is suitably journaled in a bearing 180 in the bottom of the gear box portion of frame 30. The lower end of shaft 52 extends below bearing 186 through an oil seal on stuffing box 181 and projects from the main frame 30 to receive the cutter bar 54. The seal 188 prevents particles from entering the transmission while preventing the lubricant from leaking therefrom.

The projecting end 182 of the shaft 52 has a shoulder 183 from which a threaded end 184 projects. The blade 54 has a central annular opening 185 for receiving the shaft end 182, which opening is interrupted by a slot 186. A cam washer 187 has an annular opening through which the shaft end 182 extends. A driving key portion 197 extends from the under surface of the washer 187 which projects into the slot 186 in driving relation thereto. The key portion may be applied to either side of the blade so that the blade may be inverted and be driven with either cutting edge disposed forwardly. The top of the washer has a pair of arcuate slots 188 extending therein, with the upper ends rounded to form cam surfaces over which a securing pin 189 may ride when the blade is held. The pin is preferably rolled from spring stock so as to lock in an aperture 190 disposed through the end 182 of the shaft. Below the blade 54, a washer 191 is first placed upon the shaft end 182 against which a washer 192 of rubber or like resilient material is placed, the washer 192 having a washer 193 disposed thereagainst. A nut 194 is screwed upon the threaded end 184 against the shoulder 183 to apply a proper deflection to the washer 192 for frictionally holding the blade on the shaft end 182. Apertures 195 are disposed through the body of the washer 192 for preventing the squeezing of the resilient material from between the two washers 191 and 193 which would reduce the effective resiliency thereof. A cotter or like pin 196 is applied to the threaded end of the shaft through an aperture in the nut for locking the nut on the shaft end. When the blade strikes an obstruction, it may be held from turning as the pin cams from the arcuate groove 188 or rides over the plurality of grooves until the obstruction is removed. The blade connection prevents damage to the driving mechanism when the blade is subject to shock or held against rotation and provides sufficient friction to positively drive the blade.

The combination clutch and gearing 60 which transmits motion from the vertical shaft 52 to the horizontal shaft 58 for driving ground-engaging wheels 36 and 38 is now considered. This mechanism comprises male and female clutch member 198 and 200 which are mounted on vertical shaft 52 within the gear box portion of main frame casting 30. The female clutch member 200 is fixed to the shaft by a transverse pin 202, and the male clutch member 198 is carried by a sleeve 204 which is slidable on shaft 52 to move the two clutch members into and out of engagement. A helical gear 208 formed integrally on the male clutch member 198 meshes with a helical gear 210 which is keyed or otherwise fixed on the horizontal shaft 58. According to the present invention, the pitch angle of the gear teeth is such that gear 210 exerts a camming action against gear 208 which tends to raise the latter gear and thus disengage clutch member 198 from clutch member 200. Unless the parts are otherwise restricted, forces created between the gears 208 and 210 will immediately disengage the clutch so that no power is transmitted to the driving wheels 36 and 38 of the mower.

In order to obtain a selective drive to the wheels 36 and 38, I mount a bearing 212 on sleeve 204 above the male clutch member 198 and confine the bearing against the clutch member by a snap ring 214. A yoke 216 is mounted within the gear box for rocking movement on horizontal pivots 218 and 220. The arms of the yoke 216 embrace the bearing 212 and are formed with inturned lugs 222 which bear downwardly on the outer race of the bearing. Pivot 220 extends exteriorly of the gear box and the projecting portion 224 thereof carries an upstanding spring arm 226. As perhaps best shown in Fig. 1, the hand grip 108 on the handle 90 is operatively connected to the distal end of spring arm 226 by a Bowden wire 228.

Thus the spring arm 226 can be advanced or retracted by the person operating the mower by the simple expedient of rotating the hand grip 108 in one direction or the other. When spring arm 226 is advanced, yoke 216 is actuated to press lugs 222 downwardly against bearing 212 whereby to engage the clutch members 198 and 200 against the action of helical gears 208 and 210. During normal operation of the mower, spring arm 226 will hold the clutch members 198 and 200 engaged to drive the ground engaging wheels 36 and 38, and the speed at which the wheels are driven can be effectively controlled by selective engagement of the clutch members. The Bowden wire 228 limits the amount of disengagement of the clutch members 198 and 200. By manually retracting spring arm 226, frictional engagement between clutch members 198 and 200 can be progressively reduced to gradually slow the operating speed of the mower and finally to entirely disengage the clutch elements so that no driving torque at all is transmitted to wheels 36 and 38. Also, it will be readily apparent that in the event the mower is stopped by application of a braking force against the wheels 36 and 38 or in the event one or both of the wheels or any other part of the mower comes up against an unyielding or insurmountable obstacle which prevents forward motion of the machine, gear 210 reacts automatically and instantly against gear 208 to disengage clutch members 198 and 200 against the action of spring arm 226.

Manifestly, then, the speed of the mower, i. e., of wheels 36 and 38, can be readily controlled from the handle 90 independently of the operating speed of prime mover 48 and while rotatably driving the cutter blade 54 at optimum speed. In other words, the traveling speed of the mower can be selectively controlled without affecting the rotational speed of the cutter bar 54 notwithstanding that both the cutter bar and the driving wheels 36 and 38 are driven from a common source. This is a decided advantage, since it maintains maximum operating efficiency and at the same time permits considerable flexibility of operation. By reason of the unique mechanism for controlling transmission of driving torque from the vertical shaft 52 to horizontal shaft 58, the mower can be readily operated at the speed demanded by the particular situation. This feature is particularly advantageous when mowing along borders or around trees, shrubs and the like.

As suggested, the main frame casting 30 and the front hood 56 co-operate to provide a housing for the cutter bar 54. Both the frame 30 and the hood 56 have depending arcuate flanges 230 and 232 respectively, which flanges collectively define an annular guard for the cutter bar 54. Inasmuch as the hood 56 covers the entire front of the frame 30 and the flange 232 extends downwardly below the cutter bar 54, I provide the flange with a plurality of circumferentially spaced upwardly extending recesses 234 which define depending teeth 236. Teeth 236 advance along the grass ahead of cutter bar 54 and push or deflect sticks, stones and the like to one side as a protective feature for the cutter bar. Also, the recesses 234 permit grass to readily enter the housing for contact with the cutter 54. Preferably the teeth 236 are spaced progressively farther apart from the front of the hood so that the spaces 234 all are of substantially the same width when viewed from the front of the mower (Fig. 9).

As suggested, it is a feature of this invention that grass clippings and miscellaneous debris such as leaves, small twigs, and the like picked up by the cutter bar 54 are finely chopped or comminuted by the bar before leaving the cutter housing. The finely cut or divided particles settle easily and quickly between the standing blades of grass and form a mulch which is beneficial to the lawn. In addition, the unsightly appearance created by grass clippings lying on the lawn which results from conventional practice is substantially entirely eliminated.

The above results are achieved by positioning the annular flange 230, 232 around and in close proximity to the ends of cutter bar 54, and by providing a rear hood member 238 which extends into the housing above the cutter bar through an opening in the rear flange portion 230. In practice the entire rear portion of flange 230 is cut away and the rear hood member 238 is mounted to slide back and forth in the space provided by the cutaway portion of the flange.

Hood 238 preferably is made of sheet metal and comprises a top portion 240 and an outer depending flange portion 242. The top portion 240 extends into the housing above the cutter bar 54 and is fastened to the frame casting 30 by laterally spaced screws 244 and 246. As best shown in Fig. 3, screws 244 and 246 extend through elongated slot 248 and 250 respectively in the hood 238 which permit limited sliding movement of the latter radially of the housing. When the rear hood member 238 is fully advanced, flange 242 extends substantially flush with and complements the flange 230. On the other hand, when the rear hood member 238 is retracted as shown in the drawings, flange 242 is offset rearwardly with respect to flange 230. Recesses 252 and 254 in the forward or inner edge of hood 238 and dished or depressed elongated areas 256 and 258 in the top portion 240 behind the recesses accommodate the mounting bolt of prime mover 48 and permit radial adjustment of the hood without interference from such mounting bolts.

Fastened to and depending from the hood 238 is a plurality of circumferentially spaced, radially staggered baffles 260. Three baffles 260 are here shown; however, if necessary or desirable, a greater or lesser number of baffles may be employed. Each baffle 260 preferably is arranged generally radially of the housing, and the baffles are arranged so that each baffle encountered progressively by the rotating cutter bar 54 is disposed closer to the periphery of the housing. For example, if the cutter bar 54 rotates in a clockwise direction as viewed in Fig. 3, the baffle 260 farthest to the left is disposed closest to the center of the housing, the middle baffle is disposed substantially midway between the center and the periphery of the housing, and the baffle disposed farthest to the right is disposed adjacent to the periphery of the housing.

Air currents created in the housing by the rotating cutter bar 54 as well as grass clippings and the like suspended in the air currents impinge against the baffles 260 and are deflected thereby radially outwardly of the housing. Also, the baffles 260 agitate the air in the housing and maintain a turbulent condition which brings the grass clippings repeatedly against the cutter bar 54 to assure comminution of the clippings. Manifestly, all the grass clippings are disposed in the housing and above the cutter bar 54 at the time they are severed from the standing blades of grass, and it is a function of baffles 260 to direct the clippings outwardly at the rear of the housing so that they are distributed evenly on the lawn surface. Inasmuch as the cutter bar 54 is rotatably driven at a high rate of speed and since the grass clippings cannot pass readily between the ends of the cutter bar and inner flange 230, 232, very little of the grass clippings fall to the surface of the lawn without being cut or divided at least several times by the bar.

In this connection it should be noted that the degree of comminution is controlled by adjusting the rear hood 238 radially of the housing. As the hood 238 is pulled outwardly from the innermost position and the flange 242 is offset progressively away from flange 230, more of the grass particles can escape from the housing without being brought repeatedly into contact with the cutter bar 54. Consequently, as the hood 238 is pulled outwardly, the grass clippings become coarses or larger in size. Also, it will be readily apparent that as the hood 238 moves outwardly, baffles 260 are moved farther toward the periphery of the housing and consequently they deflect a larger proportion of the grass clippings into the open area provided by the offset flange 242 and produce the even distribution thereof.

In Fig. 14 I have shown a modified driving connection between the prime mover 48 and the vertical shaft 52. This construction is primarily adapted and pre-eminently suited for mowers which are driven by an electric motor, and a prime mover of this type is shown in the drawings. It will be observed that coupling 162 and gears 158 and 180 are eliminated in the modified construction and that a modified flat top gear-box cover 140 is employed. The upper terminal portion of shaft 52 is journaled in an internal embossment 262, and the prime mover 48 is supported on the gear-box cover by a suitable mounting bracket 264 with the armature or drive shaft 266 thereof above and in alignment with shaft 52. Manifestly shafts 52 and 266 can be coupled together in any suitable manner. In the drawings I have shown a simple arrangement wherein shaft 266 is formed with a depending tongue 268 which extends into and snugly fits a correspondingly shaped groove 270 in the upper end of shaft 52. The interfitting tongue and groove arrangement effects a positive driving connection between shafts 52 and 266 and at the same time permits the motor shaft to be readily disengaged from the driven shaft. The interconnected portions of shaft 52 and 266 are supported by an upstanding, external embossment 272, and the usual bearing 274 is provided in the embossment to support the shafts for substantially frictionless rotation.

In Fig. 15 I have shown still another modified construction which permits either a horizontal or a vertical drive to be used. This form of the invention is substantially identical to the form first described except that the gear-box cover 140 is formed with a flat top surface 276 which is adapted to support a prime mover 48 having a vertical shaft such as an electric motor or the like. In the drawings I have shown a motor 48 mounted on the cover 140 and fastened thereto by cap screws 278. The armature or drive shaft 266 of motor 48 extends downwardly through a vertical bore 280 in the cover 140 and is supported for essentially frictionless rotation by a sleeve bearing 282. In the form of the invention here shown, the drive shaft 262 is rotatably connected to driven shaft 52 by a threaded stud 284.

From the foregoing it will be readily apparent that the form of the invention shown in Fig. 15 can be readily adapted for prime movers having either vertical or horizontal drive shafts. A prime mover such as an electric motor or the like having a vertical drive shaft can be readily mounted on the cover 140 and operatively connected with the driven shaft 52 as shown in the drawings. On the other hand, a prime mover such as a small gasoline engine having a horizontal drive shaft can be readily connected to the coupling 162 in the same manner as in the form of the invention first described.

Attention is now directed to Fig. 16 wherein is shown still another modified form of the invention. This form of the invention is generally similar to the form shown in Fig. 15 but is further adapted to provide a power take-off that can be used to operate a generator or the like.

More particularly, the cover 140 shown in Fig. 16 is further modified by the presence of a horizontal bore 286 lined with a removable sleeve bearing 288 which supports the shaft 290 of a sheave 292 in axial alignment with pinion 158. In the particular form of the invention here shown by way of illustration, shaft 290 is rotatably connected to the hub of pinion 158 by a threaded stud 294. Thus, when pinion 158 is rotatably driven during operation of the mower, pulley 292 is correspondingly rotatably driven and can be used to supply power as indicated above.

Figure 18:
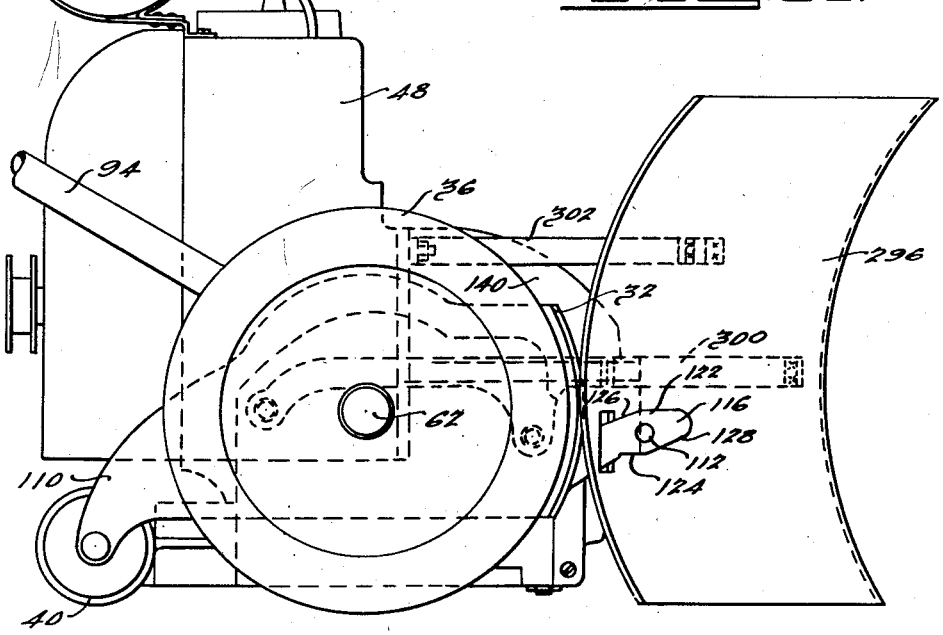
Fig. 18 is an enlarged fragmentary, side-elevational view thereof.

In Figs. 17 and 18 the mower is adapted for use as a snow plow. More particularly the plow 296, which may be of conventional size and shape, is arranged diagonally in front of the mower and with the lower edge thereof positioned to scrape the ground surface ahead of the mower. When the mower is thus adapted, arms 112 and 114 and their adjuncts are removed in order to accommodate the plow 296, and extension 116 preferably projects through an opening in the plow to help support the same. In addition, arms 298 and 300 are fastened to the plow adjacent the ends thereof and to the side flanges 72 and 74 of the mower, and arms 302 and 304 are fastened to the plow 296 substantially at the middle thereof and to the base of prime mover 48. All of arms 298—304 can be easily and quickly fastened to or disengaged from the mower to mount or demount the plow 296.

In Figs. 19–23 I have shown the mower adapted for picking up leaves from the lawn surface. More particularly, a leaf container or receptacle 306 of canvas or the like is suspended from the handle 90 behind the main frame of the mower. The rear portion of container 306 is supported by casters 308 and the forward portion thereof is connected to the main frame casting 30 for communication with the cutter-bar housing by a sheet-metal conduit 310. When the container 306 is mounted on the mower, the rear hood 238 is removed and the conduit 310 is attached to the casting 30 between the stub rollers 40 and 42 in direct communication with the openings provided in flange 230 by removal of the hood.

The container 306 here shown by way of illustration has a sheet-metal bottom 312 formed with upwardly and inwardly rolled marginal edge portions 314. The sides and top of the receptacle conveniently can be made of canvas and are supported on a suitable wire framework. Specifically, generally rectangular wire frames 315 and 317 are provided at the front and rear of the container and the front and rear canvas walls are stretched over these frames. The canvas sides of the receptacle also are attached to the wire frames 315 and 317, and the lower edges of the sides are reinforced and supported by wire elements 316. A convenient means for fastening the framework to the metal bottom 312 is shown in Fig. 23. The canvas front and rear walls and the sides of the container are wrapped around the frames 315 and 317 and the wire elements 316, and the latter are then inserted in the rolled marginal portions 314. Preferably, the vertical walls of the container 306 remain attached to the bottom 312 at all times and the rolled marginal edges 314 are rolled around the wires sufficiently to hold the parts permanently assembled. The wire frames 315 and 317 are permitted to swing relative to the bottom 312 so that they can be swung forwardly and the entire container collapsed to form a compact package. The wires 316 on opposite sides of the container are formed at the forward ends thereof with upwardly offset forward ends 318 which abut against the forward frame 315 and form stops to limit upward swinging movement of the frame. Thus stops 318 hold the container erect or expanded and prevent the supporting frames 315 and 317 from collapsing in a rearward direction. In practice, I have found it convenient to make the upper rear portions 320 of the side walls of container 306 of coarse wire mesh or the like to permit ready escape of air therefrom without loss of leaves or other solid matter in the container. The air stream discharged from conduit 310 divides within the container and exits through the mesh windows 320. These two divergent currents of air within the container moves the leaves and other debris to opposite sides of the container and thus prevents them from accumulating in a pile in the center or some localized area in the container where they would block the inlet from conduit 310. By reason of this arrangement I am able to use a relatively larger and especially a relatively wider container than would otherwise be possible. Handles 322 are provided at the rear of the container 306 to facilitate handling thereof when disengaged from the mower.

The conduit 310 is formed with a horizontal forward portion 324 and an upwardly and rearwardly inclined rearward portion 326. It preferably is essentially rectangular in transverse section. At opposite sides of the conduit are slots 328 (Fig. 22) which are adapted to receive and snugly fit horizontal fins 330 on the main frame casting 30 of the mower. The interfitting engagement between slots 328 and pins 330 holds the conduit firmly but detachably associated with the main frame casting 30 and locates the conduit properly with respect to the cutter-bar housing. If necessary or desirable, the forward portions 324 of the conduit also may be formed with arms 332 which overlie and are fastened to the casting by screws 334 or the like.

The entire middle portion of the front wall of the container 306 preferably is open to receive the rearward portion 326 of conduit 310. The bottom element 336 of the front frame 315 provides a convenient means for attaching the container 306 to the conduit 310. In this connection it will be observed that the rearward portion 326 of the conduit is formed adjacent the bottom and at opposite sides thereof with rearwardly extending tabs 338, and each tab is formed with an inverted T-shaped slot 340. Also the bottom 312 of the container is provided in the forward edge thereof with notches 319 which accommodate the tabs 338. The frame element 336 bridges the slots 319 and fits into slots 340, as shown in Fig. 22, when the container 306 is attached to the mower and cooperates in an obvious manner to support the forward end of the container. Channel members 321, welded or otherwise fastened to the bottom 312 at the outer side of and adjacent to notches 319, strengthen and reinforce the bottom and provide reinforcing bearings for the portions of frame element 336 which fit into slots 340. When the mower is propelled forwardly, the element 336 drops back into recesses 342 of slots 340; and when the mower is pulled backwardly, the element 336 advances into the forward recesses 344. It will be readily apparent that recesses 342 and 344 hold the element 336 in slots 340 at all times and interlock therewith to prevent the element 336 from being pushed inadvertently out of the slots as the mower is maneuvered back and forth or from one side to the other in use.

It will be noted from Figs. 29 and 30 that the cutter bar or blade 54 is made from a piece of strap material having the communicating apertures 185 and 186 in the center thereof and having widened end portions 340 which are twisted at an angle to provide a predetermined slope 352 thereto. Each end 354 is sharpened so that the blade can be reversed to have the trailing edge, as viewed in the figures, function as the leading edge for cutting. When the blade is employed for picking up leaves, it is desirable to have a greater degree of slope to the end portion 350 so as to produce a greater suction for lifting the leaves from the ground into the housing. The windows at the upper side of the container provide vents for expelling the air at the top sides thereof, thereby drawing the chopped leaves to the sides where they will build up toward the center to completely fill the container. The latter is emptied from time to time, as required, by grasping the handles 322 and shaking the leaves from the front opening. The container 306 is readily disengaged from the conduit 310 so that it may be emptied and reconnected to the conduit thereafter.

Referring to Figs. 27 and 28, a lawn mower is illustrated having rails 360 which are of greater length than the rails 32 to advance the wheels 36 and 38 forwardly of the position occupied in the lawn mower of Fig. 2. The pinion 66 drives the wheel from the rearward side of the wheel shaft to thereby have the wheels advance forwardly. With this arrangement, a vertically disposed shaft on an engine 362 may be directly connected to the shaft 52 which supports the blade. The vertically disposed shaft of the engine may be extended to include the shaft 52 thereby eliminating the connection between the two shafts.

The center of gravity of the frame and engine in all of the herein described constructions is always maintained rearwardly of the axis of the power wheels. As a result, the forward half of the circle covered by the swirling blade cannot tip downwardly at a slope until the power wheels pass thereover and the scalping of the lawn at the top of the slope is prevented.

In Fig. 28 the housing 30 is illustrated as having a bearing plate 364 and a collar 366 secured thereto by bolts 368. The upper end of the shaft 52 is secured in a bearing 370 in the plate 364. The collar 366 permits the application of the connector 166 to the shaft 52 and to the vertically disposed shaft 372 of the engine 362 through the D-ends 176 and 174, respectively. Normally, the mower is supported on the wheels 36 and 38 and on the stub rollers 40 which rest upon the ground, in view of the rearward balanced weight of the mower and engine. For protecting the blade and guard at the forward end, a plate 374 is riveted or otherwise secured to the hood 56 which projects downwardly at the front and is formed inwardly at the bottom at 376 to form a runner for preventing the guard from striking the ground in case of rough terrain or the forward tilting of the mower. The wheels are retained upon the rails for vertical adjustment relative to the frame in the same manner as illustrated and described with regard to the mower illustrated in Fig. 2.

In Figs. 30 and 31, rollers 378 are illustrated as being mounted directly on the hood 56 at each side thereof forwardly of the wheels 36 and 38 and disposed above the normal ground level to eliminate the possibility of having the wheels 36 and 38 raised from the ground when driven over uneven terrain which would cause the wheels to lose traction therewith. In case the mower tips forwardly, the wheels will prevent the hood from striking the ground. Otherwise the machine illustrated in Figs. 27 to 31 inclusive is the same in all details as that hereinabove described with regard to the mower illustrated in Fig. 2.

What is claimed is:

1. In a lawn mower construction, a main frame member, vertically adjustable side rail members at opposite sides of said frame member, ground-engaging wheels mounted for rotation on said side rail members, a horizontal drive shaft journaled for rotation in said frame member with the terminal portions thereof projecting laterally of the frame member at opposite sides of the latter and through said side rail members, internal ring gears carried by said wheels, pinions on the drive shaft engaged with said ring gears, means fastening said side rails to the frame, slots in said members accommodating the terminal portions of said drive shaft and said fastening means and permitting vertical adjustment of the side rail members on the frame member without disengaging said pinions from the ring gears, and interfitting means on the frame and side rail members for holding the latter precisely horizontally in all adjusted positions thereof.

2. In a lawn mower construction, a main frame, vertically adjustable side rails at opposite sides of said frame, ground-engaging wheels carried by said side rails, a horizontal drive shaft journaled for rotation in said frame, the terminal portions of said shaft projecting laterally of the frame at opposite sides of the latter and through slots in the side rails, said slots being arcuate in form and arranged concentric to the axes of said wheels, means for transmitting motion from said drive shaft to said wheels, means mounting said side rails for vertical adjustment on said frame including fastening means attaching the said rails to said frame, generally vertical arcuate slots through which said fastening means extend and in which said fastening means travel during adjustment of the side rails, and interfitting horizontal ribs on the frame and side rails for holding the latter precisely horizontally in all adjusted positions thereof.

3. In a lawn mower construction, a main frame, ground-engaging wheels supporting said frame, a horizontal shaft journaled for rotation in said frame and having a driving connection with said wheels, a gear on said horizontal shaft, a vertical shaft journaled for rotation in said frame, a cutter blade on said vertical shaft, an engine having a vertical crankshaft connected to said vertical shaft for rotatably driving said vertical shaft, a clutch on one of said shafts having cooperative friction clutch elements, one of said clutch elements being fixed to the shaft and the other of said clutch elements being loose on the shaft and movable into and out of engagement with said fixed clutch element, and gear means on said movable clutch element engaging said gear on said horizontal shaft for transmitting motion to said horizontal shaft, the teeth on said gears sloping at such angle as to have the driving gear on the clutch element override the teeth of the driven gear on the horizontal shaft to disconnect the clutch elements when the horizontal shaft is overloaded.

4. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, means for transmitting motion from said vertical shaft to said driven shaft including a clutch on the vertical shaft and a pair of coactive gear elements connecting said clutch to the horizontal shaft, sloping teeth on said gear elements tending to disengage the clutch so as to break the driving connection between the vertical and horizontal shafts when the load on the wheels causes the gear element on the clutch to override the gear element on the horizontal shaft, a yoke engaging said clutch, and manual means for operating said yoke for controlling the pressure on said clutch for regulating the speed at which said ground-engaging wheels are driven.

5. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on the vertical shaft having cooperative friction clutch elements, one of said clutch elements being fixed to the shaft and the other of said clutch elements being loose on the shaft and movable into and out of engagement with said fixed clutch element, a pair of coactive gear elements, one carried by the movable clutch element and the other by the horizontal shaft for transmitting motion from one to the other and to drive said ground-engaging wheels, sloping teeth on said gear elements exerting a force against said movable clutch element tending to separate the same from said fixed clutch element so as to disengage said clutch elements and interrupt the drive to said horizontal shaft when a breaking force is exerted on said ground-engaging wheels.

6. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on the vertical shaft having cooperative clutch elements, one of said clutch elements being fixed to the shaft and the other of said clutch elements being loose on the shaft and movable into and out of engagement with said fixed clutch element, a pair of coactive gear elements carried by the movable clutch element and the other of said shafts respectively for transmitting motion from one to the other and to drive said ground-engaging wheels, sloping teeth on said gear elements exerting a force against said movable clutch element tending to separate the same from said fixed clutch element so as to disengage said clutch elements and interrupt the drive to said horizontal shaft when a breaking force is exerted on said ground-engaging wheels, and manually operable means for selectively engaging said clutch elements against the action of said gear elements to regulate the speed at which said ground-engaging wheels are driven.

7. In a lawn mower construction, a main frame, ground-engaging wheels supporting said frame, a horizontal shaft journaled for rotation in said frame and having a driving connection with said wheels, a vertical shaft journaled for rotation in said frame, a rotatable cutter blade on said vertical shaft, means for rotatably driving said vertical shaft, means for transmitting motion from said vertical shaft to said driven shaft including a clutch on said vertical shaft, a pair of coactive gear elements having sloping teeth thereon operative to hold said clutch normally disengaged, and a manually operable gear shifter for holding said clutch engaged against the action of said gear elements.

8. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on said vertical shaft having cooperative clutch elements, one of said clutch elements being fixed to the shaft and the other of said clutch elements being loose on the shaft and movable into and out of engagement with said fixed clutch element, gear means rotatably connecting said movable clutch element and said horizontal shaft, said gear means having meshed helical teeth which react against said movable clutch element to urge the same out of engagement with said fixed clutch element, and manually operable means for holding said movable clutch element selectively engaged with said fixed clutch element against the action of said gear teeth.

9. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on said vertical shaft having cooperative clutch elements, one of said clutch elements being fixed to the shaft and the other of said clutch elements being loose on the shaft and movable into and out of engagement with said fixed clutch element, coactive helical gears carried by the movable clutch element and said horizontal shaft respectively, the arrangement being such that forces created by interengagement of said gear teeth tend to disengage the gears and thus to move said movable clutch element in a direction to disengage the same from said fixed clutch element, and means for limiting movement of the movable clutch element in said mentioned direction.

10. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on said vertical shaft having cooperative clutch elements, one of said clutch elements being fixed to the shaft and the other of said clutch elements being loose on the shaft and movable into and out of engagement with said fixed clutch element, coactive helical gears carried by the movable clutch element and said horizontal shaft respectively, the teeth of said gears reacting against said movable clutch element to move the latter in a direction to disengage the gear associated therewith from the gear on said horizontal shaft and also to disengage the movable clutch element from said fixed clutch element, a yoke carried by said movable clutch element, a spring arm on said yoke, and manual means for exerting pressure on said yoke through said spring arm in a direction to resist the action of said gear teeth and to force said clutch elements together.

11. In a lawn mower construction, a main frame, ground-engaging wheels supporting said frame, a horizontal shaft journaled for rotation in said frame and having a driving connection with said wheels, a vertical shaft journaled for rotation in said frame, a cutter blade on said vertical shaft, means for rotatably driving said vertical shaft, a clutch on said vertical shaft having cooperative clutch elements, one of said clutch elements being fixed to the shaft and the other of said clutch elements being loose on the shaft and movable into and out of engagement with said fixed clutch element, means including a spring arm coactive with said movable clutch element to hold the same in engagement with said fixed clutch element, a pair of cooperative helical gears carried by the movable clutch element and the horizontal shaft respectively for rotatably driving said ground-engaging wheels, the teeth of said gears being operative to slide the movable clutch elements in a direction to disengage said fixed clutch element and against the resilient action of said spring arm when the mower is held with the wheels stationary so as to automatically disengage the drive to said wheels.

12. A power lawn mower comprising a main frame, rotatable ground-engaging driving wheels supporting said frame, rollers behind said driving wheels also supporting said frame, a prime mover mounted on the frame between the rotational axes of said driving wheels and said rollers and having a horizontal drive shaft, a vertical shaft journaled for rotation in said frame, gear means for transmitting motion from said drive shaft to said vertical shaft, a rotatable cutter blade supported solely on said vertical shaft, a horizontal shaft, gear means connecting said shaft with said wheels, and means for driving said horizontal shaft from said vertical shaft including a gear having a friction cone clutch part thereon.

References Cited in the file of this patent

UNITED STATES PATENTS

| Number | Name | Date |
|---|---|---|
| 745,721 | Fetzer | Dec. 1, 1903 |
| 961,485 | Dale | June 14, 1910 |
| 1,441,141 | Andrews | Jan. 2, 1923 |
| 1,558,568 | St. John | Oct. 27, 1925 |
| 1,636,620 | Berry | July 19, 1927 |
| 1,691,732 | Nickels | Nov. 13, 1928 |
| 2,032,487 | Lloyd | Mar. 3, 1936 |
| 2,052,497 | Stamp | Aug. 25, 1936 |
| 2,114,096 | Noel | Apr. 12, 1938 |
| 2,134,396 | Campbell | Oct. 25, 1938 |
| 2,171,750 | Hose | Sept. 5, 1939 |
| 2,187,136 | Mellinger | Jan. 16, 1940 |
| 2,192,762 | Vincze | Mar. 5, 1940 |
| 2,198,526 | Cockburn | Apr. 23, 1940 |
| 2,231,710 | Ford | Feb. 11, 1941 |
| 2,232,261 | Orr | Feb. 18, 1941 |
| 2,236,433 | Klein | Mar. 25, 1941 |
| 2,290,533 | Campbell, Jr. | July 21, 1942 |
| 2,336,553 | Leunis | Dec. 14, 1943 |
| 2,408,459 | Tuttle | Oct. 1, 1946 |
| 2,422,792 | Lewis | June 24, 1947 |
| 2,440,934 | De Vol | May 4, 1948 |
| 2,452,267 | Schramm | Oct. 26, 1948 |
| 2,466,620 | Swift et al. | Apr. 5, 1949 |
| 2,474,524 | Hainke | June 28, 1949 |
| 2,484,201 | Winchell | Oct. 11, 1949 |
| 2,494,062 | Sherrow | Jan. 10, 1950 |
| 2,495,573 | Duke | Jan. 24, 1950 |
| 2,517,405 | Moss | Aug. 1, 1950 |

FOREIGN PATENTS

| 414,993 | Great Britain | Aug. 16, 1934 |